United States Patent Office 3,410,185
Patented Nov. 12, 1968

3,410,185
MARKING
Thomas L. Harrington, St. Paul, Minn., assignor to Minnesota Mining and Manufacturing Company, St. Paul, Minn., a corporation of Delaware
No Drawing. Continuation-in-part of application Ser. No. 314,492, Oct. 7, 1963. This application Aug. 8, 1966, Ser. No. 570,737
7 Claims. (Cl. 94—22)

ABSTRACT OF THE DISCLOSURE

A method for marking a pavement surface comprising (a) heating the surface of the pavement, (b) projecting solid, individual, pigmented particles having an organic thermoplastic phase toward the pavement, and (c) heating the parties as they proceed toward the pavement to soften the thermoplastic phase. The particles coalesce on the heated pavement as a film which is rapidly converted to a nontacky state capable of bearing road traffic.

This application is a continuation-in-part of my application Ser. No. 314,492, filed Oct. 7, 1963 and now abandoned.

This invention relates to a new method for marking pavement surfaces and new particulate materials for use in that method.

Heretofore, the marking of pavement surfaces has been accomplished by using liquid paints, plastic sheets, or hot melt extrudable materials. The time required for drying of paint-applied markings has been significantly long so that the normal flow of traffic has been seriously disrupted. Plastic film markings are time-consuming to apply, expensive, and frequently can be dislodged from their proper locations or destroyed or removed by vandals. Markings applied by laying molten plastic film from a reservoir of molten plastic require time consuming preparation before application, require complex equipment for application, and interfere with the flow of traffic during application and the period of cooling after application.

This invention overcomes the above objections of prior art marking systems and provides those skilled in the art with a simple, efficient and convenient method and material for use in applying markings to pavement surfaces in a rapid manner without significantly delaying traffic and without requiring messy clean-up of equipment after use. In fact, by practice of the invention, markings on pavement surfaces near traffic semaphore signals may be applied during the period of normal interruption of traffic flow by the signal. Markings applied according to the invention are essentially immediately (as compared to markings applied by prior art methods) ready to function as safety markings and bear road traffic. Further, the manpower costs required for application of markings according to the invention are greatly reduced (flagging and rerouting of traffic, plus use of traffic cones are obviated) as compared to the manpower costs required when using the prior art methods of applying markings.

The invention also provides in one of its embodiments, for the first time, pavement markings which are immediately reflex-reflecting as well as essentially immediately ready for use; and this is surprisingly accomplished by a single step application of particulate marking materials fabricated according to the invention, without the necessity of first applying a paint line and then dropping on beads as required in the prior art to gain immediate reflex-reflecting markings.

According to the present invention, the method for marking pavement surfaces involves first momentarily and rapidly heating (i.e., within seconds) a pavement surface to a temperature sufficient to effect coalescence of an organic phase of the new particulate materials hereof as the particulate is deposited in a directed spray with the major portion of its organic phase melted upon the pavement surface. Such temperatures will range between 150° F. and 400° F., possibly even as high as 500° F., depending upon the specific organic phase of the particulate chosen for application (e.g., its melting characteristics, curing characteristics, if any, etc.) as well as the type of pavement being marked (e.g., the heat retention characteristics and heat resistance of the pavement, whether it is formed of cement, asphalt, or some other composition). Of course, the preheat temperature to which the pavement is elevated will, if limited by the pavement composition, govern or limit the selection of the new particulate material to be applied to those particulates which, when applied with molten organic phases, coalesce under the preheat condition imparted to the pavement. Most pavements, however, are capable of withstanding preheat conditions approaching or even exceeding 400° F., or 500° F., which is quite high enough for coalescing the melted organic phase of particulate of the invention. Further, it is quite satisfactory, according to the invention, to heat a pavement surface, such as one of asphalt, to a temperature as high as that causing incipient melting of the asphalt; such preheating in fact tends to improve the bond between an applied marking composition and the pavement surface. It is also possible to use preheat pavement conditions lower than those required for melting of the organic phase of particulate, in combination with particulate applied at a temperature high enough to effect melting of the organic phase thereof during deposition, to achieve desirable well-bonded marking results as described herein.

Immediately after preheating the pavement, that is, with no time delay, particulate material of the invention is projected in a preheated state thereon. The particulate material is heated, preferably sufficiently to melt or soften a major portion of its organic phase on its way to the preheated pavement surface and is maintained under conditions of sufficient heat on the pavement surface shortly after application so that it wets the pavement surface, penetrates crevices or irregularities of that surface, and coalesces into a fused film substantially immediately after striking the pavement surface. As may be evident from the above, it is critical that at least a major portion of the organic phase of the particles of the new particulate material exhibit a melt state of initial low viscosity (below about 3,000 centipoises, even below 1,500 centipoises, on initial elevation to 300° F. when free of pigments and all other ingredients nonmelting at 300° F.), whether or not the organic portion or parts of the same also exhibits thermosetting or other curing characteristics on extended heating. Of course, the preheat temperature of the pavement as well as the heat conditions to which the particulate is subjected will be such as to effect no substantial charring of the organic phase of the particulate, or bleeding of molten substrate through the marking.

Then the coalesced film is solidified within seconds up to about one minute or so to a nontacky condition capable of bearing traffic without serious dirt contamination or visible tracking or transfer of the marker onto the wheels of vehicles passing thereover. Of course, rapid solidification to a nontacky state (i.e., termination of open-tack time) is particularly important where marking is to be accomplished in high traffic areas, as at crosswalks. On the open highway, traffic conditions will allow somewhat longer open-tack time up to about two or even three minutes on center or edge lines without serious disadvantage.

In the case of marking compositions which solidify by cooling, the time of solidification to a nontacky state is of course dependent upon ambient temperature conditions. Where pavements are at elevated temperatures, as for example caused by absorption of infra-red from the sun, the longer tack times may be expected before a marking comprising "thermoplastic" material is suitable for road traffic. However, if desired, a coolant material (for example, water, air, or even solid materials such as glass beads or sand at ambient, or lower, temperatures) may be applied over a freshly laid marking to accelerate solidification and detackification. Usually, however, heat dissipation into the pavement and to the surrounding environs takes place rapidly enough to solidify and detackify an applied film for road traffic within seconds, especially under ambient air temperature conditions below about 80° F. Of course, a combination of heat dissipation and thermosetting or related curing may be relied upon to effect solidification of a film for road traffic within seconds.

Post heating of the applied film, as by radiant or flame heat, is frequently desirable (but not always necessary) as an auxiliary means to effect fusion or coalescence of the projected particulate into a fully unified relatively smooth film condition. Post heating, preferably maintaining the temperature (e.g., 150° F. to 400° F. or even 500° F.) of the applied film high enough to keep it fluid a fraction of a second up to a few seconds, advantageously improves the unification of projected particulate into glossy film condition, but surprisingly has been found to contribute little, if anything, to fundamental bonding of the film to the pavement. It appears that the excellent bonding between film and pavement arises largely as a result of the pavement preheating step, in combination with the step of projecting particulate at a temperature high enough to fluidize its organic phase immediately prior to striking the pavement, or a temperature high enough to fluidize its organic phase essentially simultaneously on striking the preheated pavement or a fraction of a second thereafter, plus the fluidity and wettability characteristics of the heat-fluidized particulate itself. These features cause good wetting of the pavement by the particulate and coalescence of the particulate into a film.

The film marking formed as above described will, of course, be irregular or relatively smooth on its surface, depending not only on what glossing was accomplished by post heating, if any, but also upon the condition of roughness or smoothness of the pavement surface. Whether irregular or smooth, the fused film (which may, if desired be discontinuous or have minute openings or pores therethrough to the pavement, especially where the mass of particulate applied is less than necessary for complete coverage of all irregularities in the pavement surface) is tenaciously bonded to the pavement by the process of the invention and not removable by vandals or dislodged from position under the severe conditions to which traffic surfaces are subjected.

Apparatus particularly useful in practicing the method described herein is described in United States application Ser. No. 317,843, filed Oct. 21, 1963. That apparatus includes a burner assembly for preheating a pavement surface, a particulate spray conduit for application of particulate (in a current of air or similar gas) to the pavement, means to heat the particulate on its way to the pavement, a post-heating burner asembly, plus means for controlling sidewise spreading of projected or sprayed particulate. As a practical matter, the preheat burner and post heat burner are so mounted in relation to the discharge or spray conduit that effective preheating and softening or initial softening of the organic phase of the particulate is accomplished on its way to the pavement, as required.

The particulate materials for practice of the invention must exhibit a fluid melt state on heating, which means that the organic phase of the particles must, on heating, melt to a relatively low viscosity at which particles or droplets of it flow and coalesce readily together into a continuous wet film condition when deposited on the pavement. However, some of the particles of particulate may be nonmelting under the temperature conditions involved in the method of marking, and still others may be added to the composition of particulate to impart further characteristics thereto, as desired.

A most important practical characteristic for the particulate, as a new product of commerce, is that it must remain nonblocking and stable at room temperature, as well as at slightly higher temperatures (e.g., up to about 120° F.) to which it may be subjected in shipment. It must, in other words, remain solid, nontacky and freeflowing during transit and storage in order to be useful in practicing the method hereof. Further, it must contain at least a sufficient volume of organic phase materials melting to a low viscosity condition (even a watery condition) between 150° F. and 300° F. to provide the necessary wetting of a pavement surface during application as well as the necessary rapid flow to effect coalescence between particles or droplets of applied material to form a film structure. In essence, at least about 25% of the total volume of material in the particulate must be organic material having the characteristic of forming a low viscosity melt at elevated temperatures. The viscosity should be below 3,000 centipoises or possibly below 4,000 centipoises at 300° F. It preferably is even below 1,000 or 1,500 centipoises at initial heating to 300° F. At 250° F. the viscosity should be below 10,000 centipoises, or at least below 15,000 centipoises. It is preferred that the viscosity be relatively low, even below 2,500 or 2,000 centipoises at 250° F. However, the organic material of the particulate must also be solidifiable to a nontacky condition within seconds up to one minute or possibly two minutes after reduction to 100° F. or lower. Such a required combination of properties is not known to exist in any one organic material, and is a distinctly strange combination of properties not known to be exhibited by any heretofore known blend of organic materials.

Viscosities herein are all Brookfield viscosities taken with a No. 2 spindle with the revolutions per minute appropriate to the viscosity being determined.

Preferred formulas for a blend of organic materials satisfying the requirements of the invention contain at least the following: (1) a solid organic polymeric resinous material having a sharp melting point within the range of 150° F. to 300° F. as determined by the capillary tube method, and having a melt viscosity at 300° F. of less than 10,000 or preferably less than 5,000 centipoises, and most preferably less than 2,000 centipoises; plus (2) a solid organic nonomeric-type crystalline material also having a sharp melting point within the range of 150° F. to 300° F. according to the capillary tube method, and exhibiting a melt viscosity of less than 200 or preferably less than 100 centipoises at 300° F. (By sharp melting point according to the capillary tube method is meant a temperature range of no more than 15° F., usually no more than 10° F., between initial tendency of the crumbs of material in the capillary tube to become transparent and the temperature at which they become fully transparent.)

The monomeric-type material in the organic phase serves as a solvent and wetting agent for the resinous material at temperatures above the melting point of the monomeric-type material, which means that the monomeric-type material, on melting, dissolves the polymeric resinous material and aids it in wetting the substrate. In such sense, the monomeric-type material as well as the polymeric material are compatible with each other, with the monomeric-type material behaving somewhat as a plasticizer and wetting agent.

The relative proportion of the two required organic materials in a particulate mass is also important. The monomeric-type material must be used in an amount sufficient to cause rapid wetting of a pavement surface when the composition of particulate is melted thereon. Relatively low molecular weight, that is, monomeric-type, materials are useful for this function. However, the amount of monomeric-type material present with the polymeric resinous material should be limited so as to not effect room-temperature tackification of the mixture. In fact, the quantity of monomeric-type material must be so limited that the resulting mixture does not have an open tack time greater than a few seconds up to about one minute or so after being cooled to about 75° F. from a molten state. The cooled material should thereafter remain nontacky at room temperatures as well as those as high as about 150° F. Of course, where pavement surfaces are not under normal conditions subjected to particularly high temperatures, the requirement of non-tackiness at 150° F. may be reduced to nontackiness at the top limit of temperature to which the pavement is subjected in its environment. In general, the quantity of monomeric-type material in relation to polymeric resinous material may vary between approximately 1 or 3 and 20, or possibly 25, weight percent of the total weight of the organic phase in the mass of particulate. An especially preferred organic phase for the particulate hereof is one containing the condensation product of polymerized fatty acids and polyfunctional amines, together with a solid crystalline low molecular weight (below about 500) or monomeric-type material meltable to dissolve the condensation product. Many organic compositions, however, are useful, including those containing epoxy resins in combination with hardeners and, of course, fluidizing monomeric-type ingredients (e.g., phthalic anhydride).

A specific formula for the organic portion of the particulate hereof, which is illustrative and not limiting, will now be discussed under the heading Example I.

EXAMPLE I

Parts by weight

Plasticized polyamide, melting at 183° F.–201° F.
  by capillary tube method ("Versamid 950")___ 43.75
Polyamide melting at 252° F.–260° F. by
  capillary tube method ("Versamid 725") _____ 43.75
Ketone resin ("Mohawk MR-60")_____ 12.5
Chlorinated naphthalene ("Halowax 1001")_____ 5.0

Blending of the foregoing ingredients together was readily accomplished by merely melting and stirring the same at approximately 250° F. for about ½ hour.

The completed blend exhibited a viscosity at 300° F. of 460 cps. At approximately 250° F. the blend viscosity was about 1,500 cps., and at 210° F. it was about 10,000 cps. On cooling to about 75° F., it essentially lost tack immediately. Reheating of the blend to 150° F. failed to cause development of tackiness. Tackiness was, however, imparted to the blend by heating it to 155° F.

The polyamides of both polyamide components in the above formula are condensation reaction products of polymerized fatty acids and polyamines, such as disclosed and claimed in U.S. Patent No. 2,379,413. Depending on the specific fatty acid and polyamine selected, as well as the extent of reaction and termination groups, melting point as well as viscosity at elevated temperatures above melting may be varied. As here useful, such products which satisfy the requirement of melting within the temperature range of 150° F. up to but not including 300° F. are required. The plasticized polyamide in the above formula is itself a blend which melts according to the ball and ring method at about 196° F., and according to the capillary tube method from 183° F. to 201° F. It exhibits a viscosity at 300° F. of about 825 cps. and at 250° F. of about 3,000 cps. It is an intimate blend of about 5% to 15% of a mixture of ortho and para-N-ethyl-toluenesulfonamide ("Santocizer 8"), which acts as a low molecular weight plasticizer, and the condensation product of about 295 parts by weight of dimerized fatty acid of linseed oil and about 18 parts of monomeric fatty acid with about 32 parts of ethylene diamine reacted at elevated temperatures of about 200° C.–300° C. until approximately the theoretical amount of water generated on condensation is obtained. The resulting condensation product has a molecular weight of about 3,000, an amine value of about 4, a relatively sharp melting point according to the capillary tube method from 220° F. to 226° F., and a viscosity at 300° F. of about 1,300 cps., and at 250° F. of about 8,000 cps.

The straight polyamide ("Versamid 725") in the formula has a melting point of about 250° F. according to the ball and ring method and from 252° F. to 260° F. according to the capillary tube method. Its viscosity at 300° F. is about 350 cps. and at 250° F. about 22,000 cps. It likewise is a condensation reaction product of polymerized fatty acid with polyamines; and interpretation of its infra-red absorption curve indicates it to have many of the characteristics of a polyamide formed by reaction of a dimerized drying oil acid with an alkylene diamine such as ethylene diamine, likely with a low molecular weight aliphatic dicarboxylic acid such as sebacic or maleic acid on terminals of the condensation polymer. Its molecular weight is about 2,100 and amine value is 4.

The ketone resin in the formula is a condensation product of formaldehyde with cyclohexanone having a molecular weight of approximately 500 and a melting point of about 164° F. according to the ball and ring method and 133° F.–153° F. according to the capillary tube method. As 300° F. is approached, it tends to foam when heated alone. In the composition it desirably serves to lower the viscosity of the organic phase on melting. Surprisingly, it shortens the open tack time of the composition (as compared to compositions lacking it) on cooling to about 75° F. from melting temperature, but lowers the temperature at which tack is imparted to the composition on heating from about 75° F. upwards. Such behavior is considered rather anomalous. Up to about 40% by weight of the organic phase may consist of a fluidizing organic resin of relatively low molecular weight below 1,000, or possibly 1,500 (such as the ketone resin), and yet having a viscosity at 250° F. up to 10,000 cps. and at 300° F. of 5,000 cps.

The chlorinated naphthalene in the composition is a mixture of tri- and tetrachloronaphthalenes. It is a white crystalline wax-like solid with about 50% chlorine content. Its molecular weight is approximately 255, and its melting point is approximately 200° F. according to the ball and ring method. It melts to a very mobile liquid that has a very flat viscosity characteristic. Below melting it is solid and crystalline; but onec it melts it immediately becomes very watery. Further it has a very high boiling point of well above 550° F., and incidentally does not decompose at temperatures up to or during boiling. In the composition described herein, it serves on melting as a solvent for the bulk of the organic polymeric resinous material in the composition (e.g., as a solvent for the polyamide resins), lowering the viscosity of the melt as well as the temperature at which tackiness is imparted to the composition on elevating it from room temperature upwards, but surprisingly not significantly changing the open tack time of the composition on cooling from melting to about 75° F.

An interesting relationship between melt viscosities of the individual components of the organic phase of the particulate and the mixture of organic components in the particulate is to be noted from the following:

| Component | Viscosity at 300° F: in cps. | Viscosity at 250° F. in cps. |
|---|---|---|
| "Versamid 950" | 825 | 3,000 |
| "Versamid 725" | 350 | 22,000 |
| Ketone resin | | 5,900 |
| Chlorinated naphthalene | 4 | 8 |
| Entire organic phase | 461 | 1,800 |

From the foregoing, it will be seen that the blend of ingredients in the organic phase is such as to drastically lower the viscosity of the same despite the presence of a major portion of ingredients which individually exhibit comparatively higher viscosities on melting.

Whatever the explanation, it has been found that at least 1% by weight of the total organic phase up to approximately 20% or possibly 25% by weight of that phase of the particulate should consist of a crystalline material which exhibits a very low viscosity on melting and preferably a water viscosity characteristic (that is, a straight line viscosity characteristic) on melting. Chlorinated naphthalene is very effective for this purpose and, while crystalline, surprisingly tends to increase the bondability of the composition of particulate to a pavement under the method of application described; hydrogenated tallow has also been found to be effective for this purpose.

EXAMPLE II

| | Parts by weight |
|---|---|
| Polyamide melting at 221–239° F. by ball and ring method ("Versamid 930") | 78.0 |
| Polyamide melting at approximately 204° F. by the Duran mercury method ("Sunkem 526G") | 20.0 |
| Hydrogenated tallow amide ("Armid HT") | 2.0 |

The foregoing ingredients were blended together by merely melting and stirring the same at approximately 275° F. for about 1 hour. On cooling from 275° F. to 75° F., this composition essentially lost tack immediately.

The polyamides in this formula belong to the class of materials described in Example I.

The hydrogenated tallow amide in the formula ("Armid HT") has a melting point (ASTM D87–42) of 208–217.5° F. Its composition is approximately 75% stearamide; 22% palmitamide and 3% oleamide. Below its melting point it is a fairly hard wax-like material. In the composition described above, it serves to improve wetting of the substrate. When molten it serves as a solvent for the polyamides and to lower the melt viscosity of the mix.

The melt viscosities of the individual components of the organic phase are:

| Component | Viscosity at 300° F. cps. | Viscosity at 250° F. cps. |
|---|---|---|
| Versamid 930 | 5,000 | 25,000 |
| Sunkem 526G | 3,000 | 13,600 |
| Armid HT | 4.5 | 6 |
| Entire organic phase | 2,520 | 9,600 |

EXAMPLE III

| | Parts by weight |
|---|---|
| Polyamide melting at 252° F.–260° F. by capillary tube method ("Versamid 725") | 35.4 |
| Plasticizer polyamide melting at 183° F.–201° F. by capillary tube method ("Versamid 950") | 35.4 |
| Ketone resin ("Mohawk MR–60") | 10.6 |
| Chlorinated Paraffin ("Halowax 1001") | 3.6 |
| High molecular weight polyamide by ball and ring method ("Versalon XR1165") | 15.0 |

The high molecular weight polyamide of the formula is from that class of materials described in Example I, and has a ball and ring melting point of 320–338° F. Its melt viscosity at 374° F. is 2500–6500 cps. and at 437° F. is 1000–2000 cps. Other ingredients have been described hereinabove.

Blending of this composition was accomplished at about 350–400° F. for about an hour. The completed blend exhibited a melt viscosity at 300° F. of 1920 cps. and at 250° F. of 4200 cps. On cooling to about 75° F. it lost tack immediately.

This composition illustrates the suitability of adding rather high molecular weight components without upsetting required performance and with the gain of immediate loss of tack from a practical standpoint.

Coloring of markings made according to the invention is accomplished by adding hiding-type pigment coloring particles (usually minus 325 mesh but in any event no agglomerates larger than 20 mesh) such as, for example, chrome yellow (zinc, barium or lead chromate), titanium dioxide, or other inorganic pigments and pigment extenders, as well as, if desired, organometallic pigments or organic pigments such as, for example, phthalocyanine blues or greens, either alone or in combination with other pigment materials. Usually, based on the total volume of the organic and pigment (including pigment extenders) constituents in the particulate, at least 5, or possibly 10, volume percent of pigment material will be employed for adequate pigmentation. As much pigment as approximately 60 percent by volume may be employed, based on the total volume of organic phase and pigment particularly where cost reduction is desired. Pigments may be blended with the organic constituents or may be admixed as separate discrete entities within the particulate blend. Preferably, however, at least a portion of the volume of pigment (5% or 10% by volume based on total volume of pigment and organic phase) will be blended with and bonded to at least one organic ingredient of the composition so as to thereby enhance the retention of pigment within the composition as it is sprayed in particulate form upon a pavement surface. A factor to consider in connection with pigment additions is the effect the same have on the pigmented organic phase of the particulate in terms of viscosity at melting. Preferably the additions of pigment are maintained below limits which would convert the melted mixture of pigment and organic material into a viscous mass at 300° F. exhibiting a viscosity in Krebs units above about 100. Pavement markings white in color have been formed with excellent results by using organic formulas set forth in detail above with approximately 10 parts by volume of titanium dioxide pigment to every 90 parts by volume of the organic formula.

The size of the particulate for practice of the invention may vary but is preferably maintained within certain limits. From the standpoint of achieving sprayability and ready heatability and therefore ready meltability of individual particles, all particles should be capable of passing a screen of 20 mesh U.S. Standard. Preferably all should pass a screen of 40 mesh. On the other hand, at least 80 percent by weight of the particles of a particulate mass for use according to the invention should be retained upon a 200 mesh screen. Indeed, best results are obtained when substantially all particles are retained upon a 100 mesh screen; although particulate masses having up to 20 percent by weight of particles capable of passing a 100 mesh screen (and even passing a 200 mesh screen) still give excellent results. Where a large amount of particles (e.g., over 20 percent by weight) are capable of passing a 200 mesh screen, wastage occurs inasmuch as some of such small particles tend to be driven off in random directions at the time of spraying and sometimes are charred or consumed by heat adjacent the spray orifice during projection of the particles upon the pavement.

Conventional grinding techniques, including cooling the material prior to grinding, are quite suitable to employ in fabricating particulate masses satisfying the size requirements aforenoted. Preferably the organic constituents and pigments are intimately blended together prior to grinding so as to thereby form individual particles which each contain the necessary ingredients for optimum performance in use.

A surprising benefit may be gained by using particulate of the invention fabricated to contain transparent glass beads. Contrary to what would be expected in view of the prior art, a marking line applied by projecting particulate containing transparent glass beads upon a pavement surface gives an unusual action whereby many of the glass beads in the applied particulate are only partially embedded in an applied film and are immediately ready to serve, in combination with their bond interface in the pigmented diffuse-reflecting film, as reflex-reflectors. Heretofore a two step application involving painting and then dropping on beads has been required for immediate reflex reflectorization of traffic markings. Alternatively a single step application of paint with admixed beads has been used, but with the result that reflex reflection is obtained only later after traffic wears off the dried paint covering the glass beads. In the instant invention, some beads are totally embedded within the film; but a large number (e.g., upwards of 20% of the volume of glass beads in an applied mass of particulate) are exposed for immediate reflex reflection use. Further, those that are embedded serve as wear elements and also gradually become exposed to serve as reflex-reflectors after a period of traffic abrasion over the applied marking film. The glass beads useful in functions as here discussed are those having a refractive index above 1.4. Refractive index for beads on pavement preferably should be about 1.5; but markings according to the invention may be useful in special pavement applications where beads of refractive index as high as 2.0, or higher, may give useful reflex reflectorization. The diameter of the transparent beads is preferably maintained within the range of mesh sizes selected for the particles of a mass of particulate. It may vary, however, within the complete range from 3 to 30 mils (about 230 to 20 mesh), with beads of a diameter between 40 to 100 mesh preferred especially when the other particulate particles are also in that range. Useful reflex-reflection results according to the invention are gained when the volume of glass beads added lies within the range of about 15% to 50%, based upon the total volume of all constituents (including the beads) in the particulate mass, although useful results also are gained whenever any smaller quantity of beads are present.

Also, if desired, glass cullet particles, or sand, or other particles of material within the required size range for the mass of particulate may be added to it for functions as imparted by those materials, provided the total quantity of such materials plus glass beads does not exceed about 50% of the total volume of the mass of particulate. Indeed, a variety of materials may be used in forming particulate for practice of the invention. Even liquid materials may be used as an ingredient, provided they are present in small enough proportions so that normally solid ingredients obscure or prevent blocking of the bulk particulate by the liquid. Encapsulated components may also be used in the composition. Further, glass beads or other particles may be coated with organic phase ingredients.

For the first time insofar as is known, a convenient method and material for pavement marking is provided which permits marking in so rapid a manner that barricading and traffic rerouting is obviated. While long sought as a solution to the ever-increasing traffic marking problems, no prior art technique is known which approaches the speed and efficiency and convenience afforded by the method and materials of this invention. The toughness of films formed according to the invention is particularly surprising in view of the fact that toughness is ordinarily not associated with organic materials of such low molecular weight as preferably used in the particulate hereof.

I claim:
1. A method for marking a pavement surface comprising:
    (a) momentarily heating the surface of the pavement to a temperature between 150° F. and 500° F.,
    (b) projecting toward the thus heated pavement a continuous stream of solid individual particles capable of passing a screen of 20 mesh, with at least 80 weight percent being retained on a screen of 200 mesh, the particles having an organic thermoplastic phase and being nontacky, nonblocking, free-flowing, and solid at temperatures up to about 120° F., and
    (c) heating the individual particles as they proceed toward the pavement to a temperature above 150° F. sufficient to at least soften a major portion of the organic thermoplastic phase of the particles before they reach the pavement,
the heated condition of the pavement and the particles being such that the particles wet and bond rapidly to the surface of the pavement and coalesce into a film, which subsequently becomes solid, nontacky, and capable of bearing wheeled road traffic without tracking.

2. A method of claim 1 in which the particles include coloring pigment.

3. A method of claim 1 in which the particles include transparent glass beads.

4. A method of claim 1 in which the organic phase of the particles is meltable to a fluid melt of a viscosity below 3,000 centipoises at 300° F. and below 15,000 centipoises at 250° F. and solidifiable from a fluid melt to a solid nontacky condition within seconds up to one minute after being reduced in temperature to about 75° F.

5. A method of claim 1 in which the organic phase of the particles is meltable to a fluid melt of a viscosity below 1,500 centipoises at 300° F. and below 2,500 centipoises at 250° F. and solidifiable from a fluid melt to a solid nontacky condition within seconds up to one minute after being reduced in temperature to about 75° F.

6. A method of claim 1 in which the pavement and applied film are heated to a temperature above 150° F. immediately after the particles are applied.

7. A method of claim 1 in which the particles are each capable of passing a 40-mesh screen but at least 80 weight percent are retained on a 100-mesh screen.

References Cited

UNITED STATES PATENTS

| | | | |
|---|---|---|---|
| 2,657,153 | 10/1953 | Russell. | |
| 2,821,890 | 2/1958 | Wilson | 94—44 |
| 2,934,452 | 4/1960 | Sternberg | 117—2 |
| 3,018,704 | 1/1962 | Searight | 94—44 |
| 3,036,928 | 5/1962 | Poole | 94—1.5X |

OTHER REFERENCES

American City, p. 147, April 1960.
Roads And Streets, pages 68, 69, 70, 71, August 1961.

JACOB L. NACKENOFF, *Primary Examiner.*